US009116815B2

(12) United States Patent
McCauley et al.

(10) Patent No.: US 9,116,815 B2
(45) Date of Patent: Aug. 25, 2015

(54) DATA CACHE PREFETCH THROTTLE

(75) Inventors: Donald W. McCauley, Lakeway, TX (US); Stephen P. Thompson, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 311 days.

(21) Appl. No.: 13/528,302

(22) Filed: Jun. 20, 2012

(65) Prior Publication Data

US 2013/0346703 A1 Dec. 26, 2013

(51) Int. Cl.
*G06F 12/00* (2006.01)
*G06F 12/08* (2006.01)
(52) U.S. Cl.
CPC .... *G06F 12/0862* (2013.01); *G06F 2212/6024* (2013.01); *G06F 2212/6026* (2013.01)
(58) Field of Classification Search
CPC .................. G06F 12/0862; G06F 2212/6024; G06F 2212/6026; G06F 2212/6028
See application file for complete search history.

(56) References Cited

U.S. PATENT DOCUMENTS

2007/0288697 A1\* 12/2007 Keltcher ........................ 711/137
2009/0006813 A1\* 1/2009 Singhal et al. ................ 712/207

OTHER PUBLICATIONS

Stefan G. Berg. "Cache Prefetching," Technical Report UW-CSE Feb. 2, 2004, University of Washington, Feb. 2002.

\* cited by examiner

*Primary Examiner* — Cheng-Yuan Tseng
*Assistant Examiner* — Alan Otto (57) ABSTRACT

The present invention provides a method and apparatus for throttling prefetch requests for a cache. One embodiment of the method includes selecting a sequence of relative addresses for prefetching data from a memory into lines of a cache in response to detecting a cache miss to a first address. The sequence of relative addresses is determined relative to the first address. This embodiment of the method also includes issuing a prefetch request for data from a memory address indicated by one of the sequence of relative addresses when at least one previous prefetch stream accessed prefetched data associated with this one of the sequence of relative addresses.

23 Claims, 9 Drawing Sheets

DATA CACHE PREFETCH THROTTLE

BACKGROUND

This application relates generally to processor-based systems, and, more particularly, to throttling data cache prefetching in processor-based systems.

Many processing devices utilize caches to reduce the average time required to access information stored in a memory. A cache is a smaller and faster memory that stores copies of instructions or data that are expected to be used relatively frequently. For example, central processing units (CPUs), but one type of processor that uses caches, are generally associated with a cache or a hierarchy of cache memory elements. Other processors, such as graphics processing units, can also implement cache systems. Instructions or data that are expected to be used by the CPU are moved from (relatively large and slow) main memory into the cache. When the CPU needs to read or write a location in the main memory, it first checks to see whether a copy of the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

A prefetcher can be used to populate the lines in the cache before the information in these lines has been requested. The prefetcher can monitor memory requests associated with applications running in the processor and use the monitored requests to determine or predict that the processor (e.g., a CPU) is likely to access a particular sequence of memory addresses in the main memory. For example, the prefetcher may detect sequential memory accesses by the CPU by monitoring a miss address buffer that stores addresses of previous cache misses. The prefetcher then fetches the information from locations in the main memory in a sequence (and direction) determined by the sequential memory accesses in the miss address buffer and stores this information in the cache so that the information is available before it is requested by the CPU. Prefetchers can keep track of multiple streams and independently prefetch data for the different streams.

SUMMARY OF EMBODIMENTS

The disclosed subject matter is directed to addressing the effects of one or more of the problems set forth herein. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the claimed subject matter. Its sole purpose is to present some concepts in a simplified form as a prelude to the more detailed description that is discussed later.

In one embodiment, a method is provided for throttling prefetch requests for a cache. One embodiment of the method includes selecting a sequence of relative addresses for prefetching data from a memory into lines of a cache in response to detecting a cache miss to a first address. The sequence of relative addresses is determined relative to the first address. This embodiment of the method also includes issuing a prefetch request for data from a memory address indicated by one of the sequence of relative addresses when at least one previous prefetch stream accessed prefetched data associated with this one of the sequence of relative addresses.

In another embodiment, a prefetcher is provided for throttling prefetch requests for a cache. One embodiment of the prefetcher includes one or more stream engines configurable to select a sequence of relative addresses for prefetching data from a memory into lines of a cache in response to detecting a cache miss to a first address. The sequence of relative addresses is determined relative to the first address. The stream engines are configurable to issue a prefetch request for data from a memory address indicated by one of the sequence of relative addresses when at least one previous prefetch stream accessed prefetched data associated with this one of the sequence of relative addresses.

In yet another embodiment, a processor-based system is provided that supports throttling prefetch requests for a cache. One embodiment of the processor-based system includes a memory, one or more caches associated with the memory, and a prefetcher configurable to select a sequence of relative addresses for prefetching data from the memory into lines of the cache(s) in response to detecting a cache miss to the first address. The sequence of relative addresses is determined relative to the first address. This embodiment of the prefetcher is configurable to issue a prefetch request for data from a memory address indicated by one of the sequence of relative addresses when at least one previous prefetch stream accessed prefetched data associated with this one of the sequence of relative addresses.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

A prefetcher such as a data cache prefetcher may be configured to recognize cache miss patterns generated by a program and issue prefetch requests to copy data from main memory to the data cache in anticipation of possible future requests for this data. In one embodiment, the prefetcher may attempt to predict which lines of data the program may want to access in the future and then issue requests to prefetch the predicted data lines so that this data is available in the cache when the program requests it. For example, the prefetcher can monitor activity in a Miss Address Buffer (MAB) to determine what addresses the current program is accessing. Based on this information, the prefetcher may predict addresses that are likely to be used in the future and may then issue prefetch requests to the load store unit for these addresses. One approach is to flag a sequence of addresses (e.g., three or four addresses following in positive or negative sequence from the missed address) and then submit prefetch requests for the flagged addresses in the order indicated by their addresses. However, some programs or applications may not use the data from the prefetched addresses and so the system resources used to prefetch the unused data from the requested addresses may be wasted.

The present application describes embodiments of techniques for throttling prefetch requests for caches in a processor-based system. In one embodiment, a data structure that represents a prefetch stream may be modified to incorporate additional information that indicates whether the stream has accessed the different prefetch addresses. The additional information may include bits that represent the address of the cache miss that created the prefetch stream and bits that indicate whether this prefetch stream accessed the different prefetch addresses. Entries for each prefetch stream can then be stored in a database and used to determine whether to issue prefetch requests for prefetch addresses that are requested by other prefetch streams. In one embodiment, the prefetcher may flag a sequence of three or four addresses that are selected relative to the initial cache miss address. Entries for previous prefetch streams can then be analyzed to determine whether the previous prefetch streams accessed the relative prefetch addresses. If no streams (or a number of streams that is below a threshold value) accessed a particular relative prefetch address, then the request from the current prefetch stream to prefetch this address may be blocked or masked, thereby throttling the prefetch requests for the current prefetch stream.

Figure 1:
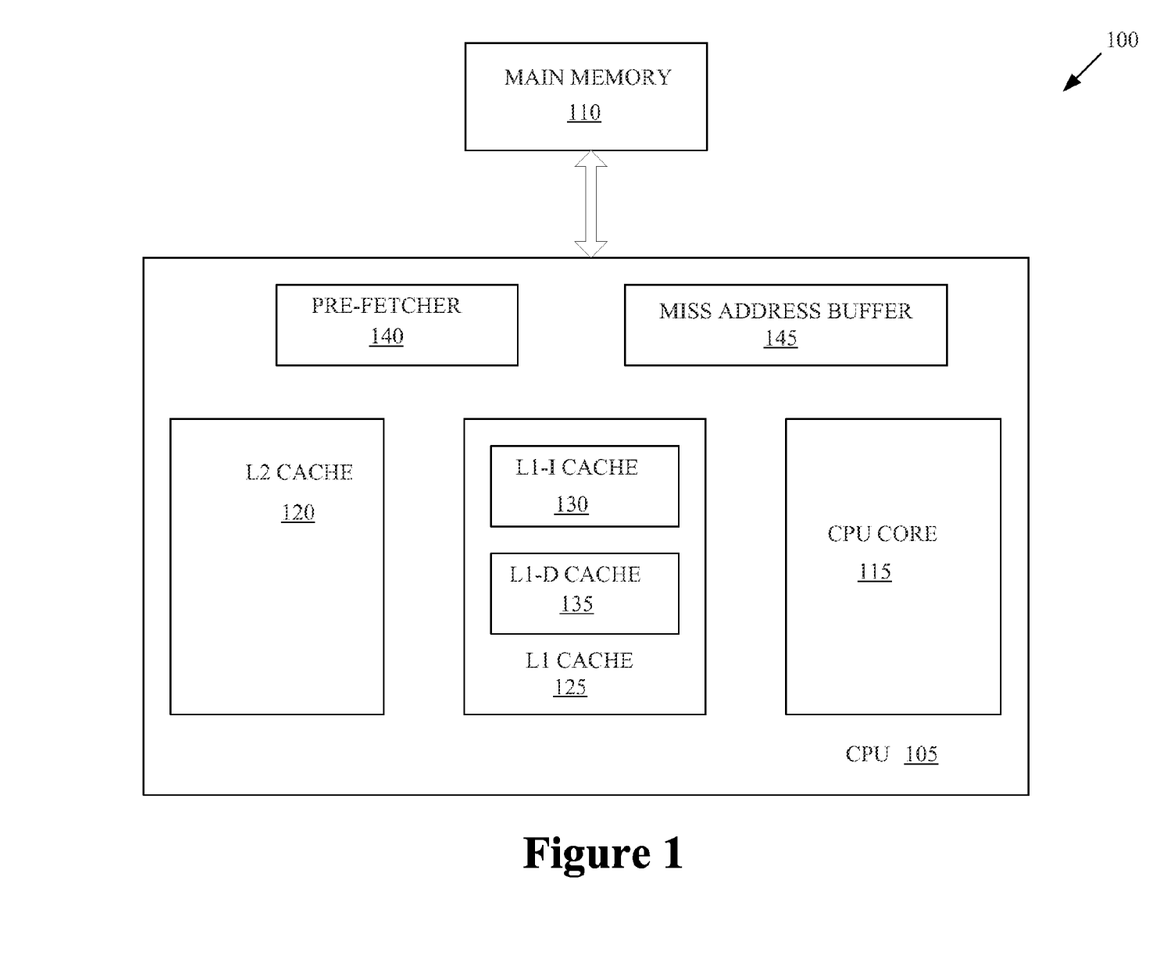
FIG. 1 conceptually illustrates a first exemplary embodiment of a semiconductor device that may be formed in or on a semiconductor wafer.

FIG. 1 conceptually illustrates a first exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions or data that are stored in the main memory 110. In the illustrated embodiment, the CPU 105 includes at least one CPU core 115 that is used to execute the instructions or manipulate the data. The CPU 105 also implements a hierarchical (or multilevel) cache system that is used to speed access to the instructions or data by storing selected instructions or data in the caches. However, persons of ordinary skill in the art having benefit of the present disclosure should appreciate that alternative embodiments of the device 100 may implement different configurations of the CPU 105, such as configurations that use external caches. Moreover, the techniques described in the present application may be applied to other processors such as graphical processing units (GPUs), accelerated processing units (APUs), and the like.

The illustrated cache system includes a level 2 (L2) cache 120 for storing copies of instructions or data that are stored in the main memory 110. In the illustrated embodiment, the L2 cache 120 is 16-way associative to the main memory 110 so that each line in the main memory 110 can potentially be copied to and from 16 particular lines (which are conventionally referred to as "ways") in the L2 cache 120. However, persons of ordinary skill in the art having benefit of the present disclosure should appreciate that alternative embodiments of the main memory 110 or the L2 cache 120 can be implemented using any associativity. Relative to the main memory 110, the L2 cache 120 may be implemented using smaller and faster memory elements. The L2 cache 120 may also be deployed logically or physically closer to the CPU core 115 (relative to the main memory 110) so that information may be exchanged between the CPU core 115 and the L2 cache 120 more rapidly or with less latency.

The illustrated cache system also includes an L1 cache 125 for storing copies of instructions or data that are stored in the main memory 110 or the L2 cache 120. Relative to the L2 cache 120, the L1 cache 125 may be implemented using smaller and faster memory elements so that information stored in the lines of the L1 cache 125 can be retrieved quickly by the CPU 105. The L1 cache 125 may also be deployed logically or physically closer to the CPU core 115 (relative to the main memory 110 and the L2 cache 120) so that information may be exchanged between the CPU core 115 and the L1 cache 125 more rapidly or with less latency (relative to communication with the main memory 110 and the L2 cache 120). Persons of ordinary skill in the art having benefit of the present disclosure should appreciate that the L1 cache 125 and the L2 cache 120 represent one exemplary embodiment of a multi-level hierarchical cache memory system. Alternative embodiments may use different multilevel caches including elements such as L0 caches, L1 caches, L2 caches, L3 caches, and the like. In some embodiments, higher-level caches may be inclusive of one or more lower-level caches so that lines in the lower-level caches are also stored in the inclusive higher-level caches.

In the illustrated embodiment, the L1 cache 125 is separated into level 1 (L1) caches for storing instructions and data, which are referred to as the L1-I cache 130 and the L1-D cache 135. Separating or partitioning the L1 cache 125 into an L1-I cache 130 for storing only instructions and an L1-D cache 135 for storing only data may allow these caches to be deployed closer to the entities that are likely to request instructions or data, respectively. Consequently, this arrangement may reduce contention, wire delays, and generally decrease latency associated with instructions and data. In one embodiment, a replacement policy dictates that the lines in the L1-I cache 130 are replaced with instructions from the L2 cache 120 and the lines in the L1-D cache 135 are replaced with data from the L2 cache 120. However, persons of ordinary skill in the art should appreciate that alternative embodiments of the L1 cache 125 may not be partitioned into separate instruction-only and data-only caches 160, 165.

The CPU 105 also includes a prefetcher 140 that can be used to populate lines in one or more of the caches 120, 125, 130, 135. The prefetcher 140 is depicted in the illustrated embodiment as a separate logical element within the CPU 105. However, persons of ordinary skill in the art having benefit of the present disclosure should appreciate that the prefetcher 140 may alternatively be implemented as a part of other logical elements. For example, the prefetcher 140 may be implemented as a part of the logic of the L1-D cache 135. In one embodiment, the prefetcher 140 can monitor memory requests associated with applications running in the CPU core 115. For example, the prefetcher 140 can monitor memory requests that result in cache hits or misses, which may be recorded in a miss address buffer 145. The prefetcher 140 may determine or predict that the CPU core 115 is likely to access a particular sequence of memory addresses in the main memory 110. For example, the prefetcher 140 may detect two or more sequential memory accesses by the CPU core 115. The direction of the sequence can be determined based on the temporal sequence of the sequential memory accesses and the CPU core 115 can use this direction to predict future memory accesses by extrapolating based upon the current or previous sequential memory accesses. The prefetcher 140 can then fetch the information in the predicted locations from the main memory 110 and store this information in an appropriate cache so that the information is available before it is requested by the CPU core 115.

Figure 2:
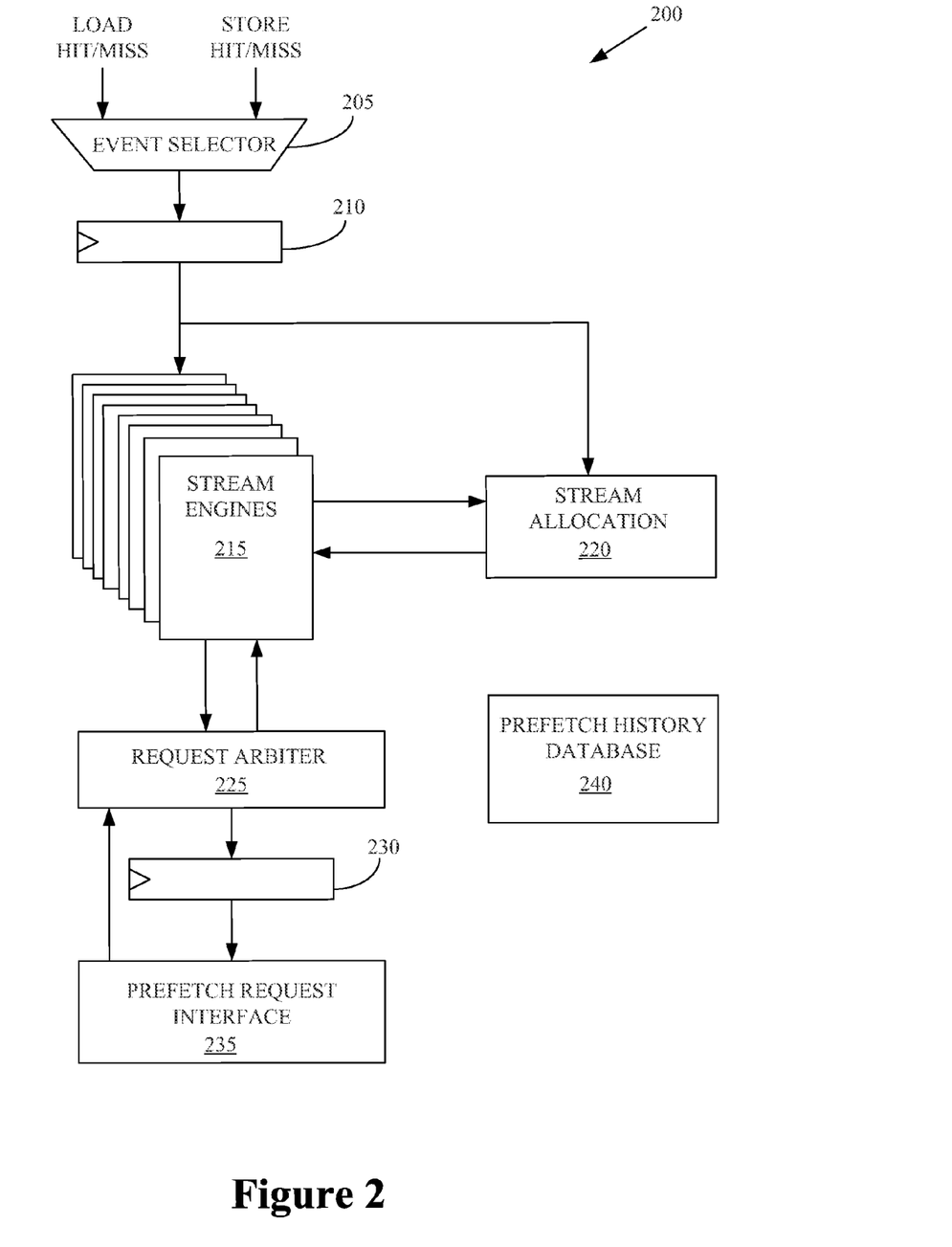
FIG. 2 conceptually illustrates one exemplary embodiment of a prefetcher such as the prefetcher depicted in FIG. 1.

FIG. 2 conceptually illustrates one exemplary embodiment of a prefetcher 200 such as the prefetcher 140 of FIG. 1. In the illustrated embodiment, the prefetcher 200 receives signals indicating particular events related to memory access requests such as hits or misses associated with a load instruction, hits or misses associated with a store instruction, and the like. Miss address buffer (MAB) events, such as hit or miss events for loads or stores, may be received or accessed by an event selector block 205, which is used to select events that are to be passed to other stages of the prefetcher 200. For example, the highest priority event may be stored in the registers 210 until they are passed to one or more stream engines 215 and a stream allocation unit 220, e.g., during a subsequent clock cycle. The priority of events can be determined using a hierarchy such as giving the highest priority to load misses and then assigning successively lower priorities to store misses, load hits, and store hits. However, persons of ordinary skill in the art having benefit of the present disclosure should appreciate that alternative hierarchies can be used to establish the priorities of the events.

In the illustrated embodiment, the prefetcher 200 includes one or more stream engines 215 that can each be used to manage a separate prefetch stream. Each stream engine 215 may provide a signal to the stream allocation unit 220 to indicate that the current event either hit or missed the stream managed by the stream engine 215. If none of the existing streams indicates a hit for the MAB miss event, then the stream allocation unit 220 can allocate a new stream to a different stream engine 215 using the current event information. When a stream is first allocated, the stream engine 215 sets a page address and an offset value to the current event cache line address. The stream engine 215 can then monitor further MAB events to detect events at addresses adjacent to the current event cache line address in either direction. For example, if the current event cache line address is set to A, then the stream engine 215 looks for events at addresses in relation to the current event cache line address, e.g., addresses A+1 or A−1. If the stream engine 215 sees one of the addresses, it defines a stream in the appropriate direction (positive for A+1 and negative for A−1) and trains a new prefetch stream. In one embodiment, the stream engine 215 maintains a set of prefetch flags that indicate potential prefetches for the current stream address, as discussed herein. The prefetch flags may be set when the new prefetch stream is trained.

The prefetcher 200 may also include a request arbiter 225 that is used to arbitrate prefetch requests from the stream engines 215. In one embodiment, the request arbiter 225 is a rotating priority arbiter. However, persons of ordinary skill in the art having benefit of the present disclosure should appreciate that other types of request arbiter 225 may alternatively be implemented in the prefetcher 200. Requests can be transferred from the request arbiter 225 to a register 230 so that the request information can be provided to a prefetch request interface 235, e.g., during a subsequent clock cycle. The prefetch request interface 235 can provide feedback to the request arbiter 225, which can be used to select or arbitrate between pending requests from the stream engines 215.

In the illustrated embodiment, the prefetcher 200 also includes a prefetch history database 240 that is used to store entries associated with current or previous prefetch streams. However, persons of ordinary skill in the art having benefit of the present disclosure should appreciate that the prefetch history database 240 may alternatively be stored or implemented in other locations either as a single database or as a distributed database for storing entries at multiple locations. The prefetch history database 240 includes information that indicates which prefetched lines were actually accessed from the cache by the program or application that caused the corresponding prefetch stream to be created. As discussed herein, information in the prefetch history database 240 may be used to throttle the prefetch requests associated with a prefetch stream, e.g., by blocking, masking, or filtering prefetch requests to relative prefetch addresses when no prior streams (or a number of prior streams that is below a threshold value) accessed data that was prefetched into the cache using the relative prefetch address corresponding to the current prefetch request.

Figure 3:
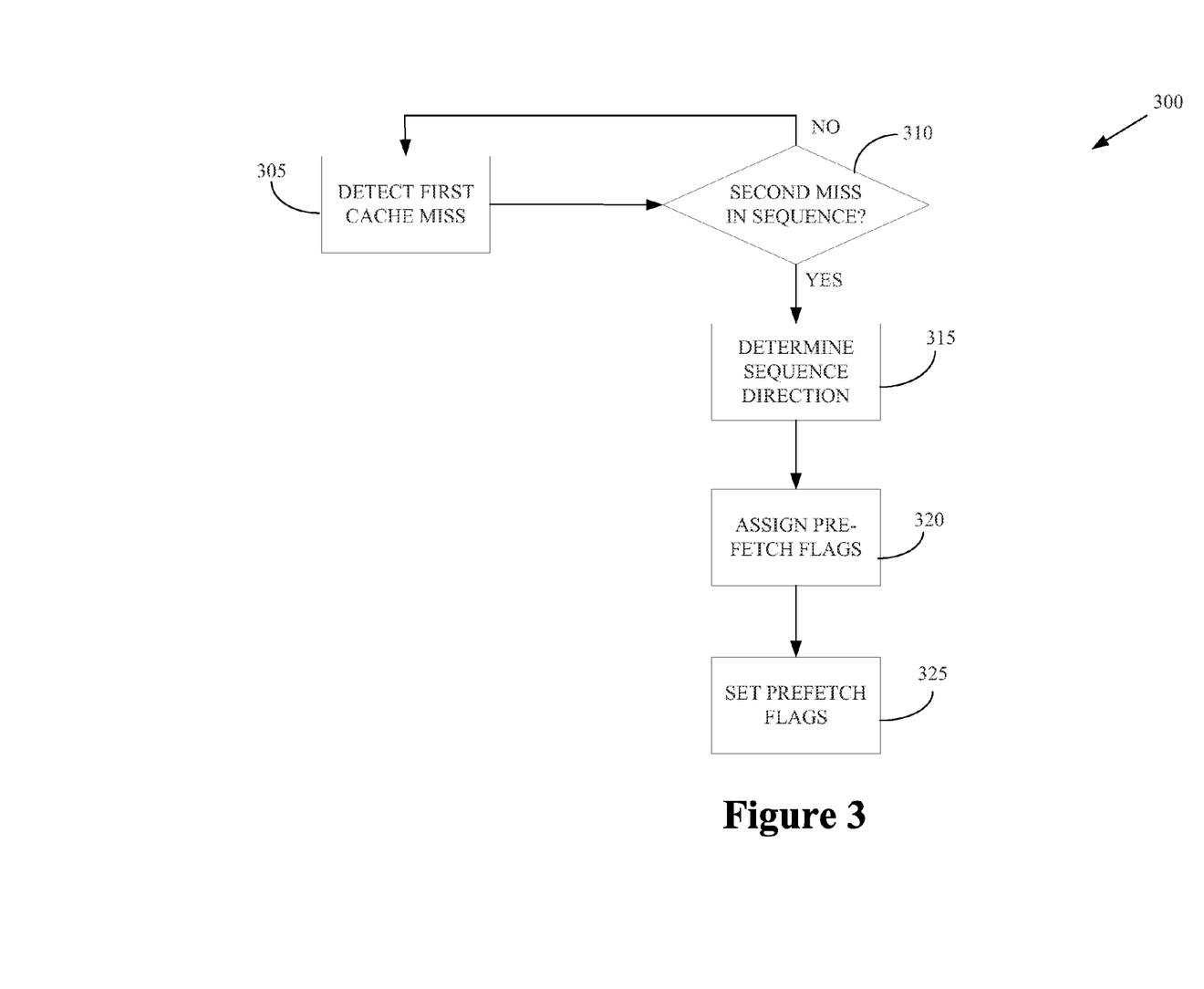
FIG. 3 conceptually illustrates one exemplary embodiment of a method for allocating a prefetch stream and identifying a look-ahead window using prefetch flags.

FIG. 3 conceptually illustrates one exemplary embodiment of a method 300 for allocating a prefetch stream and identifying a look-ahead window using prefetch flags. In the illustrated embodiment, a first cache miss is detected (at 305), e.g., using information about MAB events from a miss address buffer, and a stream is allocated to a prefetcher stream engine. The prefetcher stream engine then waits until it detects (at 310) a second miss that is in sequence (in the positive or negative direction) with the first cache miss. Although detection of cache misses to sequential addresses is used to trigger creation of a prefetch stream in the illustrated embodiment, persons of ordinary skill in the art should appreciate that alternative embodiments may use different cache miss patterns to trigger creation of a prefetch stream. For example, the prefetch stream may be allocated in response to detecting cache misses to addresses separated by a predetermined stride value or some other pattern.

In the illustrated embodiment, the stream engine can use the addresses of the first and second cache misses to determine (at 315) the sequence direction. Prefetch flags may be assigned (at 320) to a selected number of addresses in the prefetch stream. The addresses that are assigned flags follow the sequence or pattern established by the first and second cache misses. For example, flags can be assigned (at 320) to a selected number of addresses (e.g., nine addresses) that follow the address of the second miss in the direction established for the prefetch stream. A selected number of the flags can then be set (at 325) to indicate that the prefetcher should fetch information from these addresses in subsequent clock cycles. For example, flags of a subset of the addresses (e.g., four of the nine flagged addresses) can be set so that these addresses may be fetched from the memory into the caches.

Figure 4:
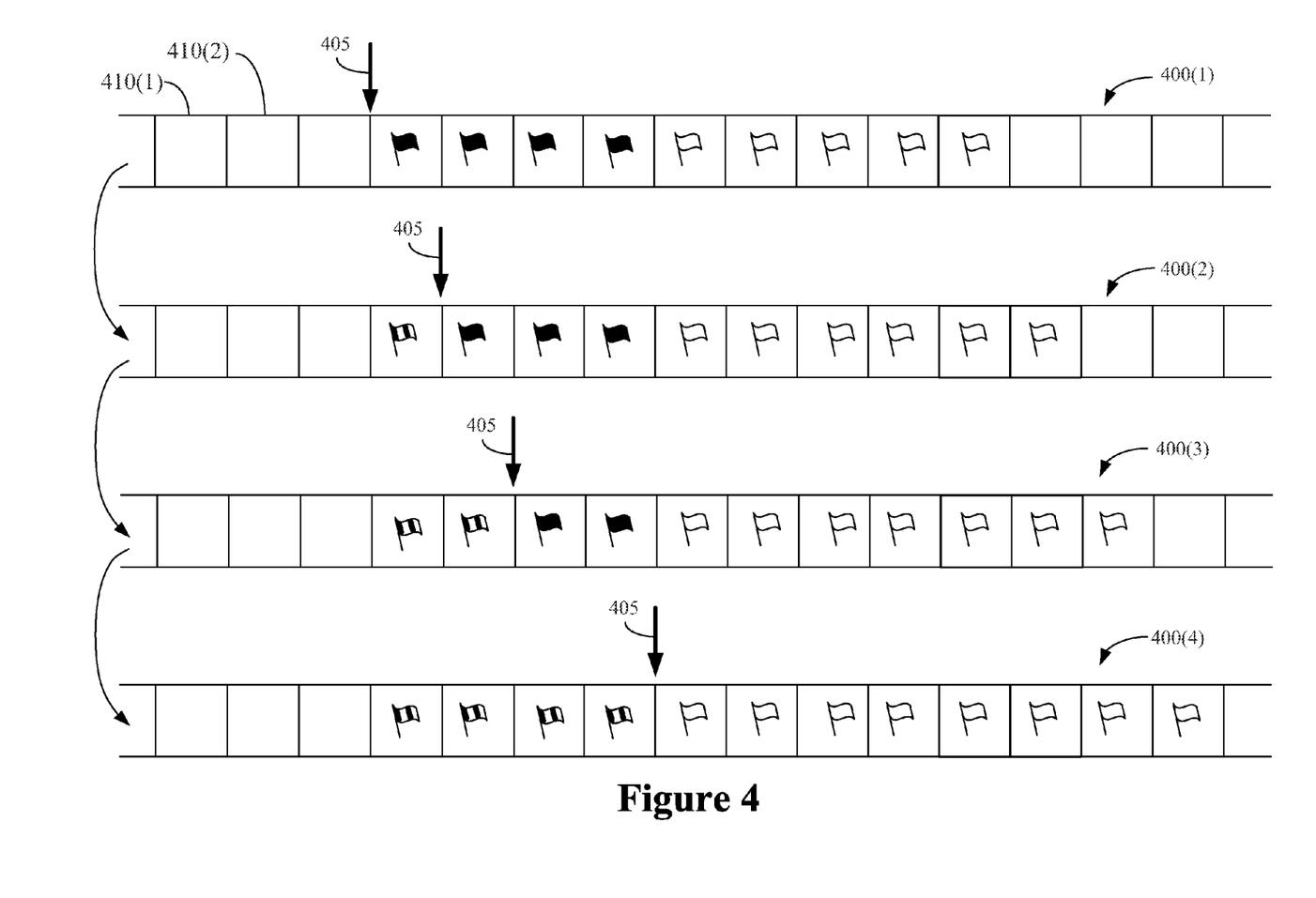
FIG. 4 conceptually illustrates a first exemplary embodiment of an address sequence that includes addresses that can be flagged and prefetched.

FIG. 4 conceptually illustrates a first exemplary embodiment of an address sequence 400 that includes addresses that can be flagged and prefetched. The address sequences 400(1-4) illustrate the same set of addresses at successive time intervals or clock cycles. In the illustrated embodiment, the address sequences 400(1-4) are depicted at successive clock cycles. However, persons of ordinary skill in the art having benefit of the present disclosure should appreciate that the address sequences 400(1-4) may not be strictly sequential and in some cases may be separated by other events, time intervals, clock cycles, and the like. In the illustrated embodiment, a prefetch stream engine has assigned flags to nine addresses ahead of a base address indicated by the arrow 405. The stream engine has also set flags of four of the addresses ahead of the base address 405, as indicated by the filled-in flags, to indicate that the information in these addresses of the memory should be fetched into the cache. Persons of ordinary skill in the art having benefit of the present disclosure should appreciate that the number of assigned flags or the number of flags in the subset of the assigned flags that are set are matters of design choice and may be varied to satisfy various design considerations.

The flags may be set in response to cache misses that are outside the look-ahead window of prefetch flags. In the illustrated embodiment, the prefetch stream is allocated and addresses of the prefetch window are flagged in response to successive cache misses 410(1-2). The flagged addresses begin at the base address 405 and the addresses are defined relative to the cache misses 410(1-2) or the base address 405. In the illustrated embodiment, the base address 405 is offset from the cache miss 410(2) by a selected address offset value of 2. For example, depending on the direction of the sequence, the flag addresses may be defined relative to the cache miss address 410(2) as (A±2, A±3, A±4, A±5, . . . ) if the address of the second cache miss 410(2) is defined as A and the relative addresses in the prefetch window are defined as (±2, ±3, ±4, ±5, . . . ). Persons of ordinary skill in the art having benefit of the present disclosure should appreciate that the address offset value is a matter of design choice and may be varied to satisfy various design considerations.

The address sequence 400(1) has a set flag at the address ahead of the base address 405. The prefetcher may therefore fetch the data at this address into the cache. Once the data has been fetched, the base address 405 may be advanced to the next address and the address that was just fetched becomes part of the history of the stream and the flag at this address becomes a history flag that is indicated by the striped flag symbol and the address sequence 400(2). An additional flag may be assigned to the address following the last address in the sequence in the direction of the established sequence so that the number of flags ahead of the base address 405 remains the same. In the illustrated embodiment, the prefetcher continues to fetch the addresses that have set flags and advance the base address 405 until all of the addresses that have set flags have been fetched. As the address corresponding to each set flag is fetched, the flag associated with this address is changed into a history flag as shown in the address sequences 400(3-4). An additional flag may be assigned to the next sequential address to maintain the number of flags ahead of the base address 405. History flags may also be dropped to maintain a set number of history flags trailing the base address 405.

However, as discussed herein, some programs or applications may not use the data from the requested address and so the system resources used to prefetch the unused data from the requested addresses may be wasted. The prefetcher may therefore throttle the prefetch requests based on access patterns for previously prefetched data. For example, a program or application may only access data in the first, second, and fourth prefetched lines corresponding to the first, second, and fourth flags that are set in the address sequence 400(1) depicted in FIG. 4. Embodiments of the prefetchers described herein may therefore select a sequence of relative addresses for prefetching data from a memory into lines of a cache, e.g. by flagging the relative addresses of a sequence of addresses determined relative to the cache miss address, and then issuing the selected prefetch requests for each relative addressing the sequence when one or more previous prefetch streams accessed prefetched data associated with the corresponding relative address. In one embodiment, the prefetcher may access stream entries stored in a database to determine whether one or more previous prefetch streams accessed prefetched data associated with the corresponding relative address.

Figure 5:
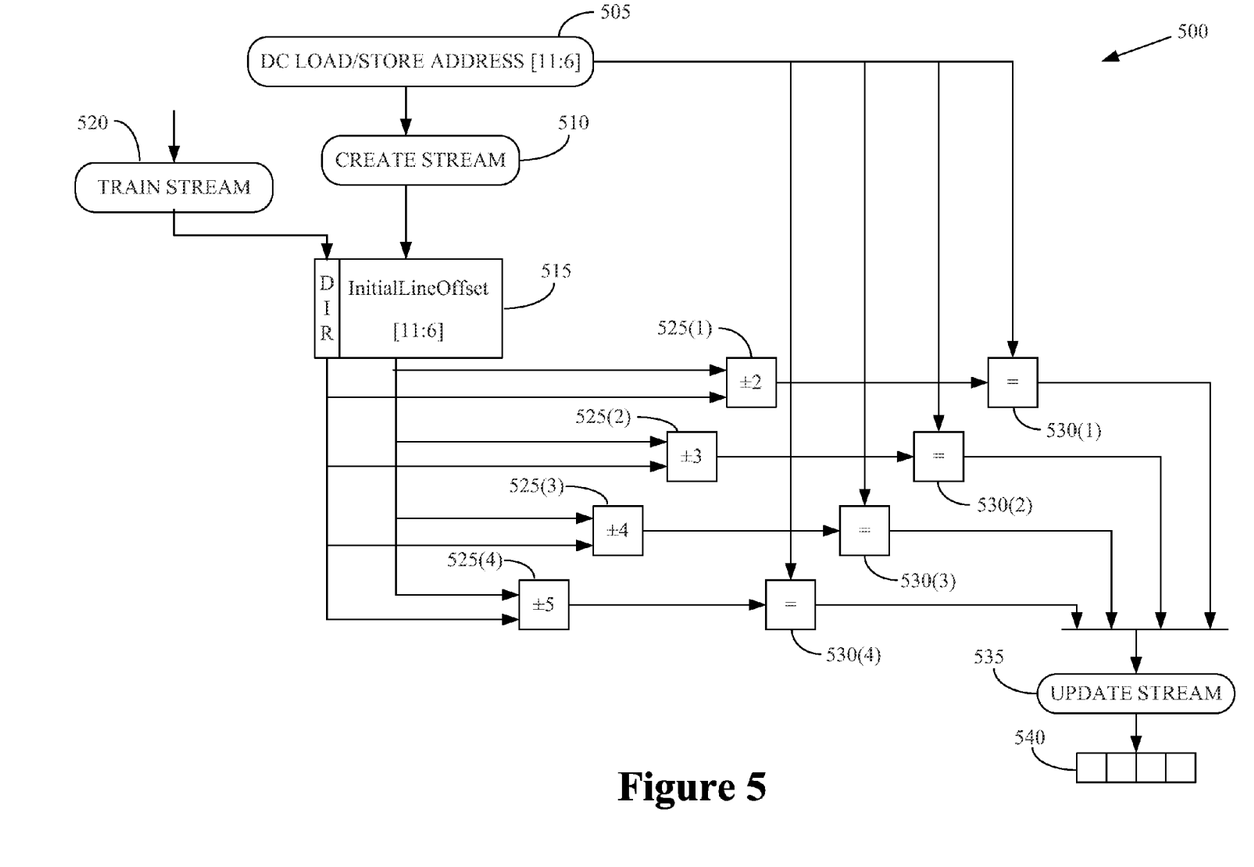
FIG. 5 conceptually illustrates one exemplary embodiment of a method for creating and training prefetch streams.

FIG. 5 conceptually illustrates one exemplary embodiment of a method 500 for creating and training prefetch streams. In the illustrated embodiment, the method 500 is initiated in response to a cache miss. For example, a program may request data from a line indicated by an address such as a 40-bit physical address [39:0] that indicates a page address [39:12] of a 4 KB page of data that includes the requested line and a 64B line offset [11:6] that indicates the location of the line within the page. The line offset for the requested address 505 may then be used to create (at 510) the new prefetch stream. In the illustrated embodiment, creating (at 510) the new prefetch stream includes storing the line offset of the cache miss address 505 as an initial line offset for the prefetch stream. The initial line offset may be stored in a portion of a database entry 515 associated with the prefetch stream. The new prefetch stream may also be trained (at 520). Training (at 520) of the new prefetch stream may include determining the direction of the stream (e.g., whether the stream occurs within ascending or descending line addresses) and setting a value of a direction bit (DIR) in the database entry 515 to indicate the direction.

Once the new prefetch stream has been created (at 510) and trained (at 520), the method 500 may keep track of subsequent accesses to the prefetched data in the cache. In the illustrated embodiment, values of the direction bit and the initial line offset stored in the database entry 515 can be used to determine the line offsets 525 of the initial prefetch requests. For example, the line offset 525(1) of the first prefetch request is determined by shifting two lines from the initial line offset in the direction indicated by the direction bit (DIR). For another example, the line offset 525(2) of the second prefetch request is determined by shifting three lines from the initial line offset in the direction indicated by the direction bit (DIR). The other line offsets 525(3-4) may be determined in a similar manner. Persons of ordinary skill in the art having benefit of the present disclosure should also appreciate that alternative embodiments may be modified to determine different numbers of line offsets corresponding to different numbers or ranges of initial prefetch requests.

The line offsets 525 corresponding to the initial prefetch requests may be compared (at 530) with the corresponding offsets 505 of data cache load/store addresses that are requested after the prefetch stream has been trained. The results of the comparison 530 may then be used to update (at 535) the stream, e.g., by modifying bits in a portion 540 of the database entry 515 to indicate whether data in the cache lines corresponding to the relative addresses of the initial prefetch requests has been accessed from the cache by the program. For example, if the offset 505 of a data cache load or store request hits one of the initially prefetched lines, as indicated by the corresponding comparison 530, then a bit in the portion 540 may be set (or a set of bits may be incremented) to indicate that this prefetched line has been accessed from the cache. In some of the embodiments described herein, the portion 540 of the database entry 515 may be referred to as the Access History of the stream and the bits in the portion 540 may be referred to as Access History bits.

Figure 6:
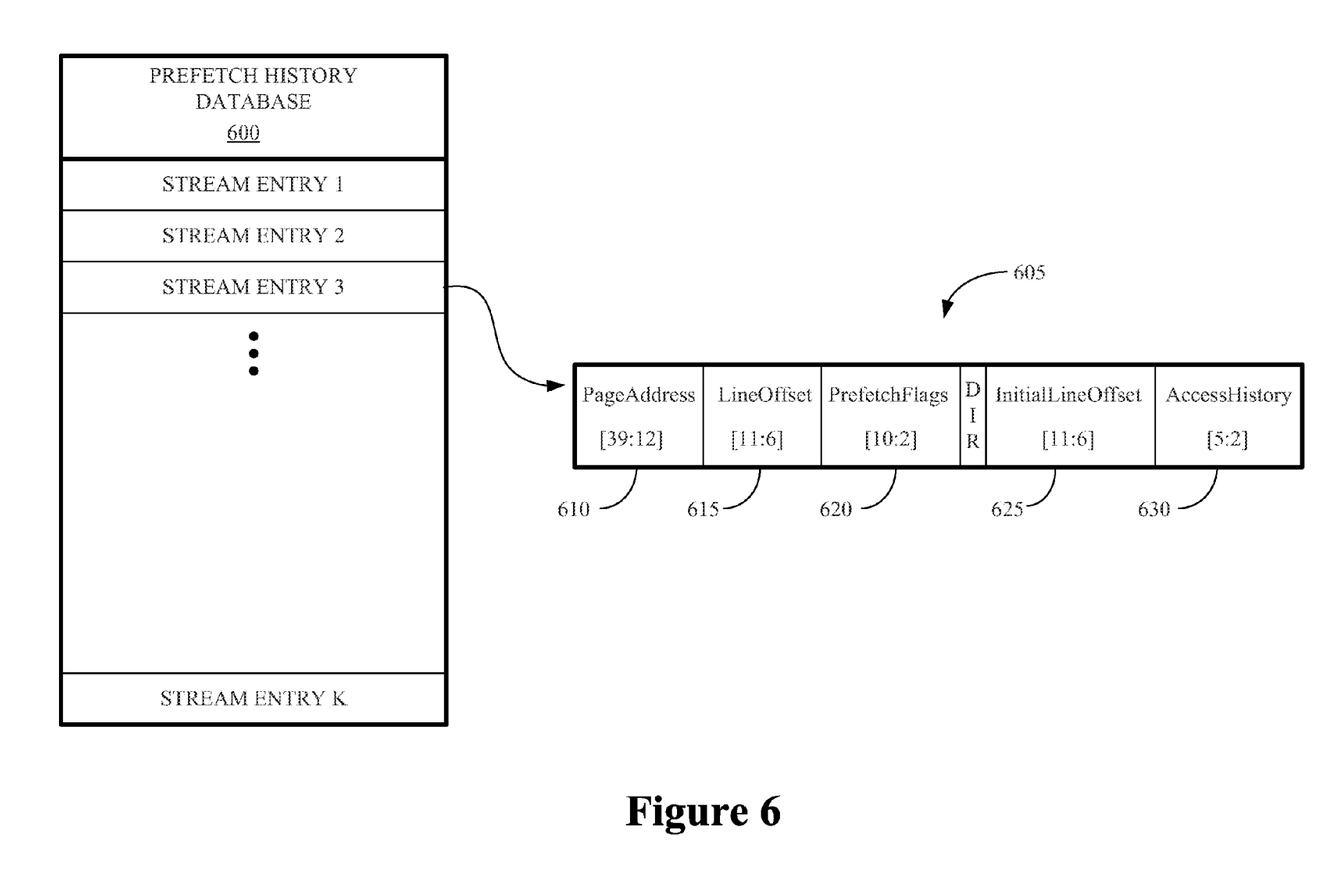
FIG. 6 conceptually illustrates one exemplary embodiment of a prefetch history database.

FIG. 6 conceptually illustrates one exemplary embodiment of a prefetch history database 600. In the illustrated embodiment, the prefetch history database 600 includes K stream entries 605. The number of stream entries 605 in the database 600 may vary over time as streams are created and retired. In some embodiments, the database 600 may limit the number of stream entries to a maximum value. However, persons of ordinary skill in the art having benefit of the present disclosure should appreciate that the maximum value, if implemented, is a matter of design choice.

The stream entries 605 shown in FIG. 6 include information indicating a page address 610 corresponding to a page of data associated with the stream, a line offset 615 that indicates the current line offset within the page associated with the stream, and prefetch flags 620 that can be set to indicate a request to prefetch data from the associated line in the page. The stream entries 605 may also include a direction bit (DIR) that indicates whether the stream corresponds to ascending or descending addresses, information 625 indicating the initial line offset of the stream, and a set of bits 630 that can be set to indicate whether prefetched data has been accessed from the cache lines associated with each of the bits. As discussed herein, the bits 630 may be referred to as Access History bits 630.

Figure 7:
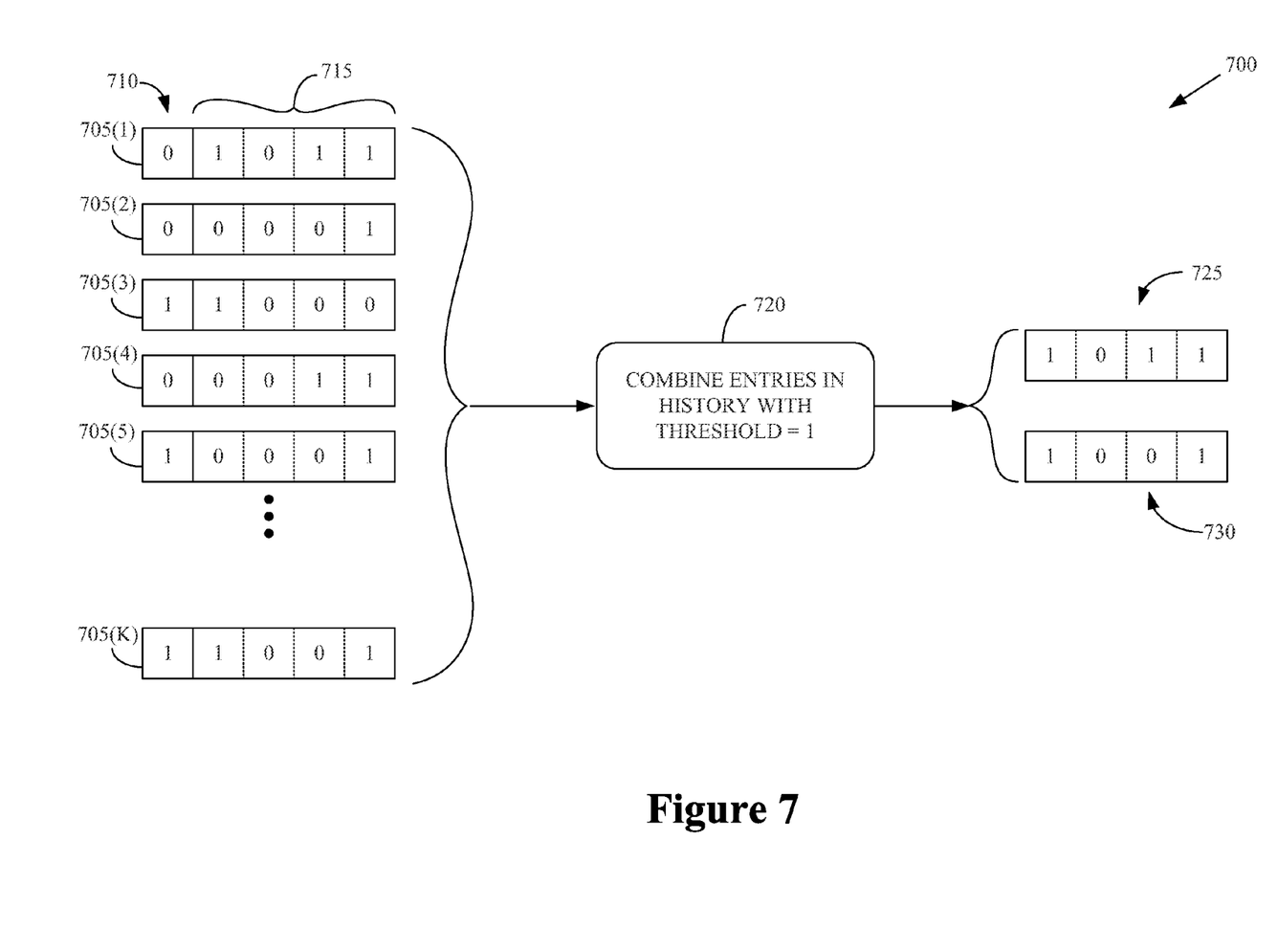
FIG. 7 conceptually illustrates a first exemplary embodiment of a method for combining information from prefetch stream database entries.

FIG. 7 conceptually illustrates a first exemplary embodiment of a method 700 for combining information from prefetch stream database entries. In the illustrated embodiment, one or more database entries 705 may be accessed, e.g., from a prefetch stream database such as the prefetch history database 600 depicted in FIG. 6. The database entries 705 include a direction bit 710 and four bits 715 that represent the Access History of the corresponding stream and indicate whether prefetched data associated with the stream has been accessed from the cache. For example, the database entry 705(1) includes a direction bit 710 that is set to "0" to indicate that the prefetch stream corresponds to ascending addresses. The database entry 705(1) also includes four bits 715 that represent the Access History of stream 1. The first, third, and fourth bits 715 are set to "1" to indicate that the initially prefetched cache lines associated with the first, third, and fourth relative addresses have been accessed at least one time. For another example, the database entry 705(3) includes a direction bit 710 that is set to "1" to indicate that the prefetch stream corresponds to descending addresses. The database entry 705(2) also includes four bits 715 that represent the Access History of stream 2. The fourth bit 715 is set to "1" to indicate that the initially prefetched cache line associated with the fourth relative address has been accessed at least one time.

The information in the database entries 705 may then be combined (at 720) to generate status bits that indicate whether one or more of the corresponding prefetch streams accessed the prefetched data cache lines corresponding to the different relative addresses. In the illustrated embodiment, the Access History bits 715 for each relative address associated with the prefetch streams for ascending addresses can be summed on a bit-by-bit basis. For example, each first Access History bit 715 can be summed with the other first Access History bits 715. The second, third, and fourth Access History bits 715 may be summed in a similar manner. The sum of the values may then be compared to a threshold value to determine whether to set corresponding status bits 725 for the ascending streams. In the illustrated embodiment, the threshold value is set to 1 so that the corresponding status bit 725 may be set if at least one stream has accessed the prefetched data from the corresponding cached line. For example, performing a bit-by-bit summation of the Access History bits 715 for the entries 705(1, 2, 4) results in setting bits one, three, and four of the status bits 725. Alternatively, a threshold value of 1 may be implemented by logically OR-ing the Access History bits 715, which would result in setting the same set of status bits 725.

In the illustrated embodiment, the Access History bits 715 associated with the prefetch streams for descending addresses can be summed (or OR-ed) on a bit-by-bit basis and the results used to set the corresponding status bits 730. For example, performing a bit-by-bit summation of the Access History bits 715 for the entries 705(3, 5, K) result in setting bits one and four of the status bits 730. Alternatively, a threshold value of 1 may also be implemented by logically OR-ing the Access History bits 715, which would result in setting the same set of status bits 730 for the descending stream entries.

Figure 8:
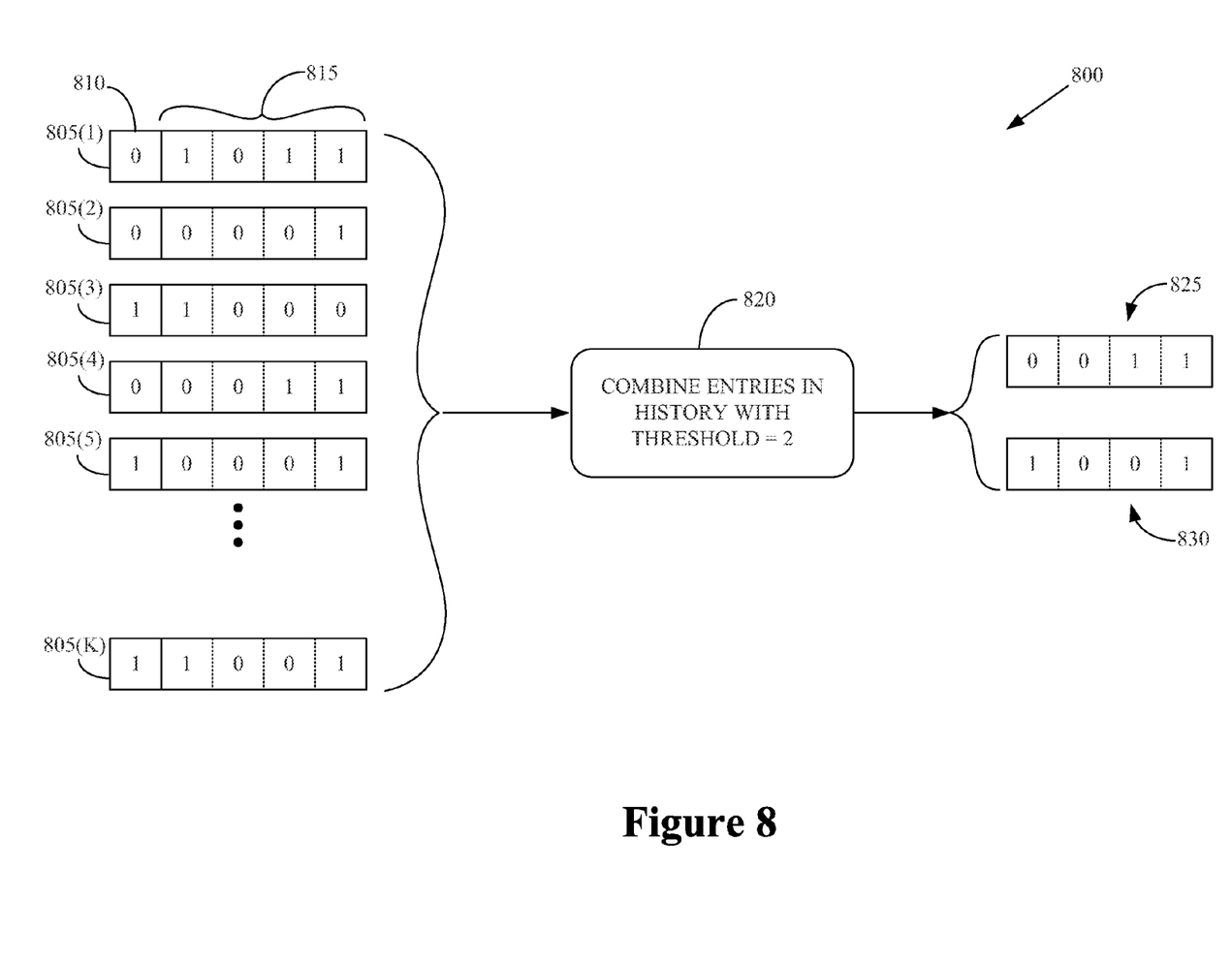
FIG. 8 conceptually illustrates a second exemplary embodiment of a method for combining information from prefetch stream database entries.

FIG. 8 conceptually illustrates a second exemplary embodiment of a method 800 for combining information from prefetch stream database entries. In the illustrated embodiment, one or more database entries 805 may be accessed, e.g., from a prefetch stream database such as the prefetch history database 600 depicted in FIG. 6. The database entries 805 include a direction bit 810 and four Access History bits 815 that indicate whether prefetched data associated with the stream has been accessed from the cache. The information in the database entries 805 may then be combined (at 820) to generate status bits that indicate whether one or more of the corresponding prefetch streams accessed the prefetched data cache lines corresponding to the different relative addresses.

In the illustrated embodiment, the Access History bits 815 associated with the prefetch streams for ascending addresses can be summed on a bit-by-bit basis. The sum of the values may then be compared to a threshold value to determine whether to set corresponding status bits 825 for the ascending streams. In the illustrated embodiment, the threshold value is set to 2 so that the corresponding status bit 825 may be set if at least two streams have accessed the prefetched data from the corresponding cached line. For example, performing a bit-by-bit summation of the Access History bits 815 for the entries 805(1, 2, 4) and comparing the result(s) to the threshold value of 2 results in setting bits three and four of the status bits 825. The Access History bits 815 associated with the prefetch streams for descending addresses can be also summed on a bit-by-bit basis and the results used to set the corresponding status bits 830. For example, performing a bit-by-bit summation of the Access History bits 815 for the entries 805(3, 5, K) and then comparing the result(s) to the threshold of 2 results in setting bits one and four of the status bits 830.

Combining the information in the prefetch stream history (e.g., using different thresholds) may allow a prefetcher to identify patterns in accesses to the cache lines. The identified patterns may then be used to throttle data cache prefetching. For example, the status bits 725, 730, 825, 830 may be used as masks or filters for prefetching data associated with ascending or descending streams.

Figure 9:
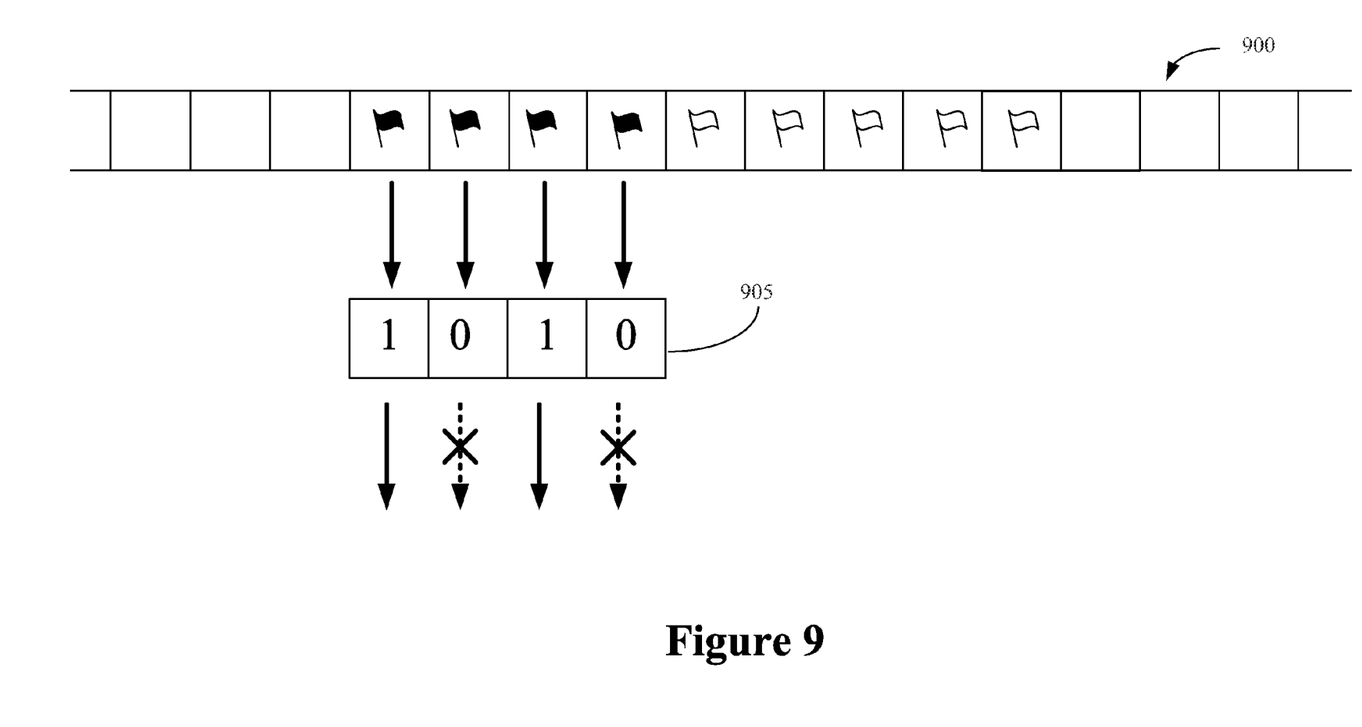
FIG. 9 conceptually illustrates one exemplary embodiment of a technique for throttling the prefetching of data for a data stream.

FIG. 9 conceptually illustrates one exemplary embodiment of a technique for throttling the prefetching of data for a data stream 900. In the illustrated embodiment, a sequence of addresses in the data stream 900 has been flagged for potential prefetching and the flags for the first four sequences have been set, as indicated by the filled-in black flags. A set of status bits 905 that correspond to the flags that are initially set for prefetching may then be used to throttle the prefetch requests by blocking, masking, filtering, or other similar operation. In the illustrated embodiment, the status bits 905 may be set based upon information indicating whether other streams have accessed prefetched cache lines associated with the relative addresses that correspond to each status bit in the set 905, as discussed herein. For example, the status bits 905 may be set according to embodiments of the techniques depicted in FIG. 7 or 8.

Prefetch requests may then be throttled so that only prefetch requests for lines corresponding to the relative addresses indicated by set status bits 905 are issued, e.g., to a load store unit. For example, the first and third status bits 905 shown in FIG. 9 are set and so the prefetch requests may be throttled so that only prefetch requests for cache lines indicated by the first and third relative addresses are issued. If none of the status bits 905 are set, then none of the prefetch requests indicated by the set prefetch flags may be issued. If no prefetch requests are issued, no prefetch requests are completed and prefetching of the addresses in the stream 900 may not advance. Consequently, the stream 900 may effectively be dead or terminated when none of the status bits 905 are set.

Throttling prefetch requests according to embodiments of the techniques described herein may have a number of advantages over conventional practice. For example, if a program or application sometimes accesses two adjacent lines but rarely accesses any additional lines in the sequence indicated by the two adjacent lines, issuing prefetch requests in response to detecting two adjacent access requests by the program or application may degrade system performance. However, embodiments of the techniques described herein may be able to determine that the program or application rarely if ever accesses any of the prefetched cache lines. In that case, throttling prefetch requests may save significant system resources without significantly impacting performance of the program or application. Simulations performed by the inventors have indicated that embodiments of the throttling techniques described herein result in significant savings. For example, savings of up to 20% in the performance-per-Watt for data cache activity may be achieved.

Embodiments of processor systems that can throttle prefetch requests as described herein (such as the processor system 100) can be fabricated in semiconductor fabrication facilities according to various processor designs. In one embodiment, a processor design can be represented as code stored on a computer readable media. Exemplary codes that may be used to define or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    selecting a sequence of relative addresses for prefetching data from a memory into lines of a cache in response to detecting at least one cache miss to at least one first address, wherein the sequence of relative addresses is determined relative to said at least one first address;
    issuing a prefetch request for data from a first memory address indicated by one of the sequence of relative addresses when at least one previous prefetch stream of a plurality of prefetch streams accessed prefetched data associated with said one of the sequence of relative addresses, each of the plurality of prefetch streams comprising a different sequence of addresses; and
    blocking a prefetch request for data from a second memory address indicated by another relative address of the sequence of relative addresses when less than a threshold number of separate ones of the plurality of prefetch streams accessed data associated with said another relative address of the sequence of relative addresses.

2. The method of claim 1, wherein selecting the sequence of relative addresses comprises selecting a predetermined number of relative addresses beginning at a predetermined offset from said at least one first address.

3. The method of claim 2, wherein selecting the sequence of relative addresses comprises selecting a sequence of relative addresses in a positive or negative direction relative to said at least one first address.

4. The method of claim 1, wherein issuing the prefetch request comprises issuing the prefetch request from the memory address indicated by said one of the sequence of relative addresses when more than a threshold number of previous prefetch streams accessed the prefetched data associated with said one of the sequence of relative addresses.

5. The method of claim 1, comprising determining whether said at least one previous prefetch stream accessed prefetched data associated with said one of the sequence of relative addresses using at least one database entry for said at least one previous prefetch stream.

6. The method of claim 5, wherein said at least one database entry comprises a plurality of bits, each bit of the plurality of bits assigned to a corresponding one of the sequence of relative addresses, wherein each bit of the plurality of bits indicates whether said at least one previous prefetch stream accessed prefetched data associated with the corresponding one of the sequence of relative addresses.

7. The method of claim 6, wherein said at least one database entry comprises information indicating an address of a cache miss that initiated creation of said at least one previous prefetch stream.

8. The method of claim 1, comprising training a new prefetch stream in response to detecting said at least one cache miss to said at least one first address.

9. The method of claim 8, wherein training the new prefetch stream comprises generating a new database entry that comprises a plurality of bits associated with the sequence of relative addresses.

10. The method of claim 9, wherein training the new prefetch stream comprises adding information indicating an address of a cache miss that initiated the creation of the new prefetch stream to the new database entry.

11. The method of claim 9, comprising modifying the value of one of the plurality of bits in response to the new prefetch stream accessing prefetched data from a memory address associated with the relative address corresponding to said one of the plurality of bits.

12. A hardware prefetcher, comprising:
    at least one stream engine configurable to select a sequence of relative addresses for prefetching data from a memory into lines of a cache in response to detecting at least one cache miss to at least one first address, wherein the sequence of relative addresses is determined relative to said at least one first address, wherein said at least one stream engine is configurable to:
        issue a prefetch request for data from a first memory address indicated by one of the sequence of relative addresses when at least one previous prefetch stream of a plurality of prefetch streams accessed prefetched data associated with said one of the sequence of relative addresses, each of the plurality of prefetch streams comprising a different sequence of addresses; and
        block a prefetch request for data from a second memory address indicated by another relative address of the sequence of relative addresses when less than a threshold number of separate ones of the plurality of prefetch streams accessed data associated with said another relative address of the sequence of relative addresses.

13. A processor-based system, comprising:
    at least one cache associated with a memory; and
    a prefetcher configurable to:
        select a sequence of relative addresses for prefetching data from the memory into lines of said at least one cache in response to detecting at least one cache miss to at least one first address, wherein the sequence of relative addresses is determined relative to said at least one first address;
        wherein the prefetcher is configured to issue a prefetch request for data from a first memory address indicated by one of the sequence of relative addresses when at least one previous prefetch stream of a plurality of prefetch streams accessed prefetched data associated with said one of the sequence of relative addresses, each of the plurality of prefetch streams comprising a different sequence of addresses; and
        wherein the prefetcher is configured to block a prefetch request for data from a second memory address indicated by another relative address of the sequence of relative addresses when less than a threshold number of separate ones of the plurality of prefetch streams accessed data associated with said another relative address of the sequence of relative addresses.

14. The processor-based system of claim 13, wherein the prefetcher is configurable to select a predetermined number of relative addresses beginning at a predetermined offset from said at least one first address.

15. The processor-based system of claim 14, wherein the prefetcher is configurable to select a sequence of relative addresses in a positive or negative direction relative to said at least one first address.

16. The processor-based system of claim 13, wherein the prefetcher is configurable to issue the prefetch request from the memory address indicated by said one of the sequence of relative addresses when more than a threshold number of previous prefetch streams accessed the prefetched data associated with said one of the sequence of relative addresses.

17. The processor-based system of claim 13, wherein the prefetcher is configurable to use at least one database entry for said at least one previous prefetch stream to determine whether said at least one previous prefetch stream accessed prefetched data associated with said one of the sequence of relative addresses.

18. The processor-based system of claim 17, wherein said at least one database entry comprises a plurality of bits, each bit of the plurality of bits assigned to a corresponding one of the sequence of relative addresses, wherein each bit indicates whether said at least one previous prefetch stream accessed prefetched data associated with the corresponding one of the sequence of relative addresses.

19. The processor-based system of claim 18, wherein said at least one database entry comprises information indicating an address of a cache miss that initiated creation of said at least one previous prefetch stream.

20. The processor-based system of claim 13, comprising a stream allocator configurable to allocate a new prefetch stream in response to detecting said at least one cache miss to said at least one first address.

21. The processor-based system of claim 20, wherein allocating the new prefetch stream comprises generating a new database entry that comprises a plurality of bits associated with the sequence of relative addresses.

22. The processor-based system of claim 21, wherein allocating the new prefetch stream comprises adding information indicating an address of a cache miss that initiated the creation of the new prefetch stream to the new database entry.

23. The processor-based system of claim 21, wherein the prefetcher is configurable to modify the value of one of the plurality of bits in response to the new prefetch stream accessing prefetched data from a memory address associated with the relative address corresponding to said one of the plurality of bits.

* * * * *